（12） United States Patent
Liu et al.

(10) Patent No.: US 8,693,771 B2
(45) Date of Patent: Apr. 8, 2014

(54) METHOD FOR PAN-SHARPENING PANCHROMATIC AND MULTISPECTRAL IMAGES USING DICTIONARIES

(75) Inventors: Dehong Liu, Lexington, MA (US); Petros T Boufounos, Boston, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 125 days.

(21) Appl. No.: 13/299,847

(22) Filed: Nov. 18, 2011

(65) Prior Publication Data

US 2013/0129207 A1    May 23, 2013

(51) Int. Cl.
*G06K 9/00* (2006.01)

(52) U.S. Cl.
USPC .......................................... 382/165

(58) Field of Classification Search
None
See application file for complete search history.

(56) References Cited

U.S. PATENT DOCUMENTS

| | | | | |
|---|---|---|---|---|
| 6,011,875 | A * | 1/2000 | Laben et al. | 382/276 |
| 7,298,922 | B1 * | 11/2007 | Lindgren et al. | 382/294 |
| 2004/0109613 | A1 * | 6/2004 | Guleryuz | 382/274 |
| 2009/0226114 | A1 * | 9/2009 | Choi et al. | 382/284 |

OTHER PUBLICATIONS

Elad et al., "Image Denoising Via Sparse and Redundant Representations Over Learned Dictionaries," IEEE Trans. Image Proc., vol. 15(12), pp. 3736-3745, Dec. 2006.*
Aharon et al., "K-SVD: an algorithm for designing overcomplete dictionaries for sparse representation," IEEE Trans. Sig. Proc., vol. 54(11), pp. 4311-4322, 2006.*
Atul Divekar et al. "Image Fusion by Compressive Sensing," in Geoinformatics, 2009 17th International Conference on 2009.
Shutao Li et al. "A New Pan-Sharpening Method Using a Compressed Sensing Technique," IEEE Trans. Geosci. Remote Sens., vol. 49(2), pp. 738-746, Feb. 2011.

* cited by examiner

*Primary Examiner* — Bhavesh Mehta
*Assistant Examiner* — Feng Niu
(74) *Attorney, Agent, or Firm* — Gene Vinokur; Dirk Brinkman

(57) ABSTRACT

A single panchromatic (Pan) image and a single multispectral (MS) image are Pan-sharpened by extracting features from the Pan image and the MS image. The features are decomposed into features without missing values and features with missing values. A dictionary is learned from the features without missing values. The values for the features with the missing values are learned using the dictionary. The MS image is merged with the Pan image including the predicted values into a merged image, and the merged image is then Pan sharpened.

14 Claims, 3 Drawing Sheets

1: Input $\epsilon_0$, $K$, $\lambda$, and $T_0$
2: initialize $k = 0$, err $= 1$, $\mathbf{X}_0^{MS} = \bar{\mathbf{X}}^{MS}$.
3: while $k < K$ and err $> \epsilon_0$ do
4: $\quad k = k + 1$
5: $\quad \tilde{\alpha} = \operatorname{argmin}_\alpha \|\tilde{\mathbf{X}}_{k-1} - \tilde{\mathbf{D}}\alpha\|_F^2$ s.t. $\forall i$, $\|\alpha_i\|_0 \leq T_0$
6: $\quad \tilde{\mathbf{X}}_k = \tilde{\mathbf{D}}\tilde{\alpha}$
7: $\quad \mathbf{X}_k^{MS} = \frac{\mathbf{E}^{MS}\tilde{\mathbf{X}}_k + \lambda \bar{\mathbf{X}}^{MS}}{1+\lambda}$
8: $\quad \mathbf{X}_k = [\,(\mathbf{X}_k^{MS})^T \;\; (\mathbf{X}^{Pan})^T\,]^T$
9: $\quad$ err $= \frac{\|\mathbf{X}_k^{MS} - \mathbf{X}_{k-1}^{MS}\|_F}{\|\mathbf{X}_k^{MS}\|_F}$
10: end while
11: Output $\hat{\mathbf{X}} = \mathbf{X}_k$.

Iterative procedure to minimize objective function

*Fig. 2*

METHOD FOR PAN-SHARPENING PANCHROMATIC AND MULTISPECTRAL IMAGES USING DICTIONARIES

FIELD OF THE INVENTION

This invention relates generally to Pan-sharpening images, and more particularly to sharpening panchromatic and multispectral images using dictionaries.

BACKGROUND OF THE INVENTION

A large number of satellite imaging systems, such as QuickBird, IKONOS and ALOS, produce two kinds of images: panchromatic (Pan) and multi-spectral (MS). The Pan image provides a high spatial resolution without color information, whereas the MS image provides color spectrum information, but at a reduced spatial resolution.

For a variety image applications, such as target and material identification, it is necessary to obtain MS images with both high spatial and spectral quality. Pan-sharpening merges high resolution panchromatic and low resolution multispectral images to generate a single high resolution color image to increase image quality. Typically, Pan-sharpening produces a high-resolution color image from three, four or more low-resolution spectral bands, plus a corresponding high-resolution panchromatic band.

A number of Pan-sharpening methods are known, such as Intensity-Hue-Saturation (IHS), Principal Component Analysis (PCA), wavelet based merging, variational methods and others. Although those methods seem different, their basic steps are similar.

First, the low resolution (LR) MS image is interpolated to be the same size as the high-resolution (HR) Pan image.

Second, the high frequency component of the Pan image is merged with the interpolated MS image in a method-dependent way. For instance, in the IHS-based method, the intensity (I) component of the interpolated MS image is replaced by the Pan image, whereas in the PCA-based method, the principal component of the interpolated MS image is replaced by the Pan image.

Third, the merged data is transformed to the image domain to achieve a merged image.

Pan-sharpened MS images generally have good spatial resolution, but often exhibit color distortions. To improve color accuracy and reduce color distortion, a variety of methods are known, each specific to a particular merging technique or image set. Most of those methods focus on how to insert the high frequency component of the Pan image in the interpolated MS image, without considering the distortion caused by interpolating the MS at the initialization of the merge process.

Compressive sensing, sparse representations, and dictionary learning (DL) provide new tools to address this problem. Specifically, dictionary learning has been applied to the Pan-sharpening problems, where HR Pan and LR MS images are treated as compressive measurements. Using sparsity in a learned dictionary as a regularization prior, the HR MS images can be recovered by solving a sparse recovery problem.

However, those methods require a large number of HR MS training images to train the dictionary, which are typically not available in practice.

SUMMARY OF THE INVENTION

Pan-sharpening is an image merging process in which high resolution (HR) panchromatic (Pan) images are used to sharpen corresponding low resolution (LR) multi-spectral (MS) images. Pan-sharpened MS images generally have high spatial resolutions, but exhibit color distortions.

The embodiments of the invention provide a method for Pan-sharpening using dictionary learning to reduce color distortion caused by the interpolation of the MS images. Instead of interpolating the LR MS image before merging, we generate an improved MS image based on sparse representation of learned dictionary using an iterative process.

In contrast with the prior art, our dictionary is learned from a single Pan image and a single MS image. That is, our method does not require training on a larger set of images prior to its use. Instead, it works directly on the Pan and MS image to be pan-sharpened.

BRIEF DESCRIPTION OF THE DRAWINGS

FIG. 2 is a block diagram of pseudocode of a procedure to minimize an objective function for predict the missing data according to embodiments of the invention.

DETAILED DESCRIPTION OF THE PREFERRED EMBODIMENT

Dictionary Learning Based Pan-Sharpening

Dictionary learning is the process of learning a set of vectors (atoms), which can be used to sparsely represent a signal. Consider a signal $y \in R^{n \times 1}$ represented by $y = D\alpha$, where $D \in R^{n \times k}$ is a dictionary that contains the atoms as its columns, and $\alpha \in R^{k \times 1}$ is a representation vector. The dictionary is used to capture the structure in the class of natural signals of interest. Specifically, a signal is sparse in a dictionary D if it can be represented by a sparse $\alpha$, i.e., a linear combination of a few atoms from D are able to represent the signal y with small error. The vector $\alpha$ is sparse if most of its coefficients are 0 and very few are non-zero.

For example, features of the natural images can be sparsely represented in carefully designed dictionaries, using e.g., discrete cosine transforms (DCT) or a wavelet basis. Typically, designed dictionaries has the advantage of efficient implementation and signal-independent design.

An alternative choice is to learn the dictionary from training data $Y = \{y_1, \ldots, y_L\}$. More specifically, we would like learn the dictionary directly from the input, i.e., the input images to be Pan-sharpened are our training data.

Figure 1:
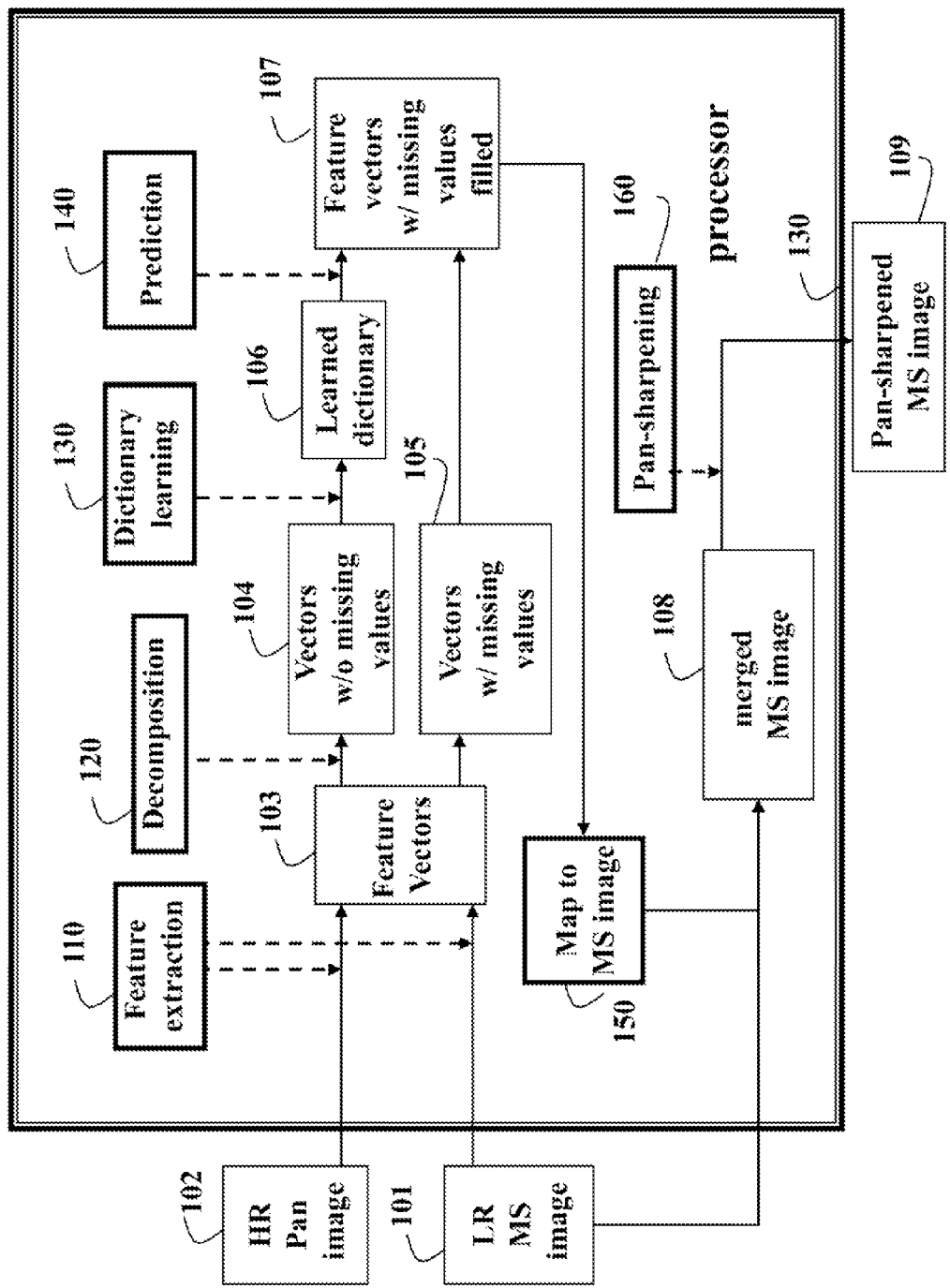
FIG. 1 is a flow diagram of Pan-sharpening panchromatic and multispectral images using dictionaries according to embodiments of the invention.

As shown in FIG. 1, input to the method is a LR MS image 101 and a HR Pan image 102. These two images are the training data for learning our dictionary.

Features 103 are extracted 110 from the input images in the form of vectors. The vectors 103 are decomposed into vectors without missing values 104, and vectors with missing values 105.

The vectors without the missing values 104 are used to construct a dictionary 106 using dictionary learning 130.

The missing values are predicted (filled) 140 for the vectors with the missing values, using the dictionary, and are then mapped 150 to the MS image.

The dictionary is used obtain a merged MS image 108.

Conventional Pan-sharpening can be applied to obtain the Pan-sharpened MS image 109.

The above steps can be performed in a processor 130 as known in the art connected to memory and input/output interfaces. The steps are now described in greater detail.

In Pan-sharpening, our objective is to reconstruct a Pan sharpened HR MS image 109 from the HR Pan image 102 and the LR MS image 101. Exploiting the fact that different materials exhibit different panchromatic and color values, we explore the structure of color spectrum using dictionary learning.

To achieve this objective, we consider signal vectors x coupling color and Pan features 103 extracted from the MS and Pan images $x=[(x^{MS})^T (x^{Pan})^T]^T$. Because the MS image has a low resolution, some of the high-resolution image coefficients include only panchromatic information $x^{Pan}$ but no color information $x^{MS}$.

Thus, we learn the dictionary 106 from the existing signal vectors $X=\{x\}$, and predict in the missing values of $x^{MS}$ using the corresponding panchromatic information $x^{Pan}$ and the learned dictionary.

We consider a Pan-sharpening problem, where only one LR MS image and one HR Pan image are available as input. Without loss of generality, we assume the LR MS image is composed of M bands, each of (pixel) size I×J, and the Pan image is of size NI×NJ, having N times the resolution of the LR MS image. For example, in QuickBird and IKONOS satellite imaging systems, M=4 and N=4.

Each pixel in the LR MS image corresponds to an P×P patch in the HR Pan image. For all I×J LR MS pixels, there are I×J corresponding patches of size P×P, and vice versa. The I×J patches may or may not overlap with each other and typically cover the entire Pan image. For example, if P=N the patches do not overlap and exactly tile the Pan image.

We learn a dictionary using these patches. To use that dictionary and form the MS image of the size NI×NJ, we consider all of the overlapped patches of size P×P, each mapping to one MS pixel. This mapping process enables us to use the trained dictionary on all the HR MS pixels.

Training Data

We assume that the Pan image and MS image are registered with each other before the Pan-sharpening process 160. Registration also implies a correspondence between a pixel location in the LR MS images and the corresponding pixel in the corresponding HR Pan patch. For example, the LR MS pixel location might correspond to a corner of the HR Pan patch, to its center, or to a pixel near the patch center, among others. As an example, we henceforth consider the correspondence with the upper right corner of the patch, with patch size P=N which tiles the entire image.

The training data are constructed as follows. Let $z_{i,j}^{MS}= [z_{i,j}^{(1)} z_{i,j}^{(2)} \ldots z_{i,j}^{(M)}]^T$ represent the M dimensional vector 104 of color values of pixel (i,j) in the MS image with mean value $\bar{z}_{i,j}^{MS}$, and $z_{(Ni,Nj)}^{Pan}=[z_{(N(i-1)+1, N(j-1)+1)} \ldots z_{(Ni,Nj)}]^T$ the $P^2$ dimensional vector 105 of gray values of the corresponding P×P patch in the Pan image cornered at pixels (N(i−1)+1, N(j−1)+1) and (Ni,Nj), with mean value $\bar{z}_{i,j}^{Pan}$.

Typically, a dictionary learning procedure subtracts the mean value of each training data vector. However, our experience indicates that the mean values of the color spectrum and Pan patches are important for Pan-sharpening. Therefore, we can keep the mean values as extra features of training data vector.

In other words, for each pixel in the MS image, we consider an M+1 dimensional MS feature vector $y_{i,j}^{MS}=[(z_{i,j}^{MS})^T - \bar{z}_{i,j}^{MS}, \bar{z}_{i,j}^{MS}]^T$, with i=1, 2, ..., I and j=1, 2, ..., J, and for each corresponding Pan patch an $N^2+1$ dimensional Pan feature vector $y_{i,j}^{Pan}=[(z_{i,j}^{Pan})^T - \bar{z}_{i,j}^{Pan}, \bar{z}_{i,j}^{Pan}]^T$.

The training data vectors couple the feature vectors 103 by $y_{i,j}=[(y_{i,j}^{MS})^T (y_{i,j}^{Pan})^T]^T$, such that we can predict 140 spatial information in the LR MS image. For all pixels in the MS image, we form an $(M+P^2+2)\times(IJ)$ training data matrix $Y=\{y_{i,j}\}$. Training data vectors are constructed from the feature vectors 103, without missing values, extracted from both the HR and MS images 101-102. Pan image. We use the K-SVD to train the dictionary.

To learn the dictionary from the training data vectors, we solve the following minimization problem:

$$\bar{D}=\mathrm{argmin}_{D,\alpha} \|Y-D\alpha\|_F^2 \, s.t. \, \forall l, \|\alpha_l\|_0 \leq T_0 \qquad (1)$$

where $\alpha=[\alpha_1, \alpha_2, \ldots, \alpha_L]$ is a set of sparse coefficient vectors corresponding to L training data vectors, $T_0$ is a desired sparsity, and $\|\cdot\|_F$ denotes a Frobenius norm. The training data vectors are derived from some or all the pixels in the MS image and the corresponding patches in the Pan image.

Testing Data

Testing data are constructed in a similar way, except that the Pan patches overlap. Let $x_{p,q}=[(x_{p,q}^{MS})^T (x_{p,q}^{Pan})^T]^T$ represent a testing data vector, with p=1, 2, ..., NI and q=1, 2, ..., NJ. The testing data matrix is $X=[(X^{MS})^T (X^{Pan})^T]^T$. Because we do not have the HR MS image available, most of the MS related entries in the testing data matrix are missing, and to be predicted from the dictionary.

Iterative Updating

Given the learned dictionary, we predict the missing data in the testing data. One option would predict the missing data similar to dictionary learning based image inpainting. Inpainting can reconstruct isolated patches missing data.

Unfortunately, that approach does not work well because the missing data are not randomly distributed in the testing data matrix, but uniformly distributed over the entire spectral feature vector 105.

Intuitively, because different colors can correspond to the same gray level, it is impossible to predict colors of pixels according to gray values without knowing any color information.

To solve this problem, constraints on the testing data are necessary. Considering the fact that the interpolated LR MS image is an estimate of the HR MS image, we can put a constraint on the distance between the interpolated MS image and the prediction from the learned dictionary. In other words, we treat the interpolated LR MS image as a noisy version of the HR MS image, with a constraint on the noise level.

An objective function is $$\hat{X}=\mathrm{argmin}_X \|X-\tilde{D}\alpha\|_F^2 + \lambda\|E^{MS}X-\bar{X}^{MS}\|_F^2 \, s.t. \, \forall l, \|\alpha_l\|_0 \leq T_0$$
$$\text{and } E^{Pan}X=X^{Pan} \qquad (2)$$

where $E^{MS}$ are the first (M+1) rows and $E^{Pan}$ are the last $(P^2+1)$ rows of an $(M+P^2+2)\times(M+P^2+2)$ identity matrix, and $\bar{X}^{MS}$ denotes the MS feature of linear interpolated MS image. X, $\bar{X}^{MS}$, and $X^{Pan}$ all have the same number of columns, L', which is the size of the interpolated MS image, typically equal to NI×NJ.

The weight λ controls the contribution of the interpolated MS image. When λ=∞, the solution to Eqn. (2) is the interpolated MS image; and when λ=0, Eqn. (2) is equivalent to image inpainting. Eqn. (2) is solved by an iterative procedure as shown in FIG. 2. After we obtain $\hat{X}$, we can map $\hat{X}$ to the MS image $\hat{Z}$.

In other words, the reconstructed image can be sparsely represented by the learned dictionary with small error, and also the reconstructed image should be very close to the interpolated image.

In FIG. 2, the input step 1 receives an error tolerance $\epsilon_0$, the number of iterrations K, a weight λ and a tolerance level $T_0$, and at step 2 the output estimate is initialized as the interpolated image. The iterations are performed as long as the error is greater than the tolerane level and the number of iterations is less than K. The other variables in the steps are described above.

Figure 3:
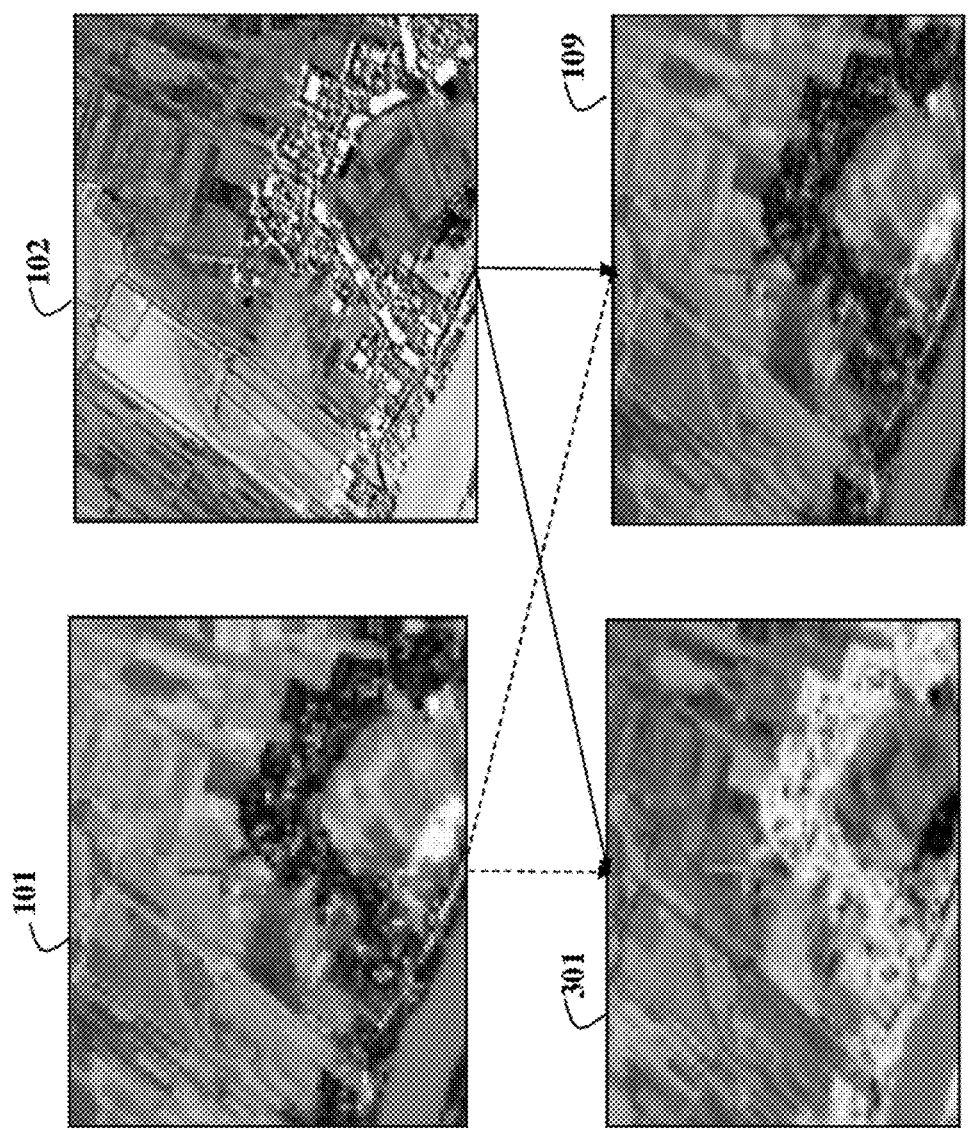
FIG. 3 are images comparing conventional Pan-sharpening and Pan-sharpening according to embodiments of the invention.

As shown in FIG. 3, because the training data do not include any HR MS images information, the DL based MS image can still be blurry. Nevertheless, the DL based MS resolution is much better than a conventional interpolated MS image 301. Consequently, less color distortion can be achieved with further Pan-sharpening 160.

EFFECT OF THE INVENTION

The embodiments of the invention provide a dictionary learning (DL) based Pan-sharpening method to reduce color distortion caused by interpolating MS images, without requiring a large number of training images.

Compared to conventional Pan-sharpening methods, the novelty of our DL based Pan-sharpening method lies in three aspects.

The method focuses on generating the MS image with improved resolution using DL, instead of a simply interpolating the LR MS image. Thus, the method can be combined with any prior art Pan-sharpening method that is initialized by interpolating a MS image.

The method does not require a large number of HR MS images to learn the dictionary, only the images need to be sharpened.

The method provides an iterative procedure to update the MS image according to image sparsity and consistency, yielding a MS image with less distortion.

In addition, our DL based method can be applied to hyper-spectral data with minimal modifications.

Our dictionary learning based Pan-sharpening process has a number of advantages. Compared with prior art Pan-sharpening methods, including dictionary-learning based ones, our method does not require a large amount of high resolution MS images for training, and it can be combined with other Pan-sharpening algorithms using an MS interpolating process. Our dictionary learning process can be easily extended to merge hyper-spectral data with small modifications.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for Pan-sharpening a single panchromatic (Pan) image and a single multispectral (MS) image, comprising:
    interpolating the MS image to a resolution of the Pan image to produce an interpolated MS image;
    extracting features, in the form of vectors, from the Pan image and the interpolated MS image;
    decomposing the features into features without missing values and features with missing values, wherein the missing values in the Pan image are spectral values and the missing values in the interpolated MS image are interpolated spatial values;
    learning a dictionary from the features without missing values;
    predicting the values for the features with the missing values using the dictionary, wherein the predicting minimizes an objective function $\hat{X} = \mathrm{argmin}_{X,\alpha} \|X - \tilde{D}\alpha\|_F^2 + \lambda \|E^{MS}X - \tilde{X}^{MS}\|_F^2 \, s.t. \, \forall l, \|\alpha_l\|_0 \leq T_0$ and $E^{Pan}X = X^{Pan}$ where X is a set of L' vectors representing the Pan and interpolated MS images, $\tilde{D}$ is the dictionary, $\alpha = [\alpha_1, \alpha_2, \ldots, \alpha_{L'}]$ is a set of sparse coefficient vectors representing X in the dictionary $\tilde{D}$, $T_0$ is a desired sparsity, and $\|\cdot\|_F$ denotes a Frobenius norm, $\lambda$ is a weighting vector, $E^{MS}$ and $E^{Pan}$ are first and last rows of identity matrices; and
    merging the interpolated MS image with the Pan image including the predicted values into a merged image, wherein the steps are performed in a processor.

2. The method of claim 1 wherein the features from the Pan image are patches of the Pan image.

3. The method of claim 2 wherein the patches of the Pan image cover the whole Pan image.

4. The method of claim 2 wherein the patches of the Pan image tile the whole Pan image.

5. The method of claim 1 wherein the features of the interpolated MS image are pixel values of the interpolated MS image.

6. The method of claim 2 or 5 wherein the pixels of the interpolated. MS image correspond to the patches of the Pan image.

7. The method of claims 2 or 5, wherein the features also include mean values of patches in the Pan image and the interpolated MS image.

8. The method of claim 1, wherein the dictionary sparsely represents signals, wherein the signals couple color and Pan features extracted from the interpolated MS and the Pan image, respectively.

9. The method of claim 1, further comprising:
    registering the Pan image and the MS image with each other before the interpolating.

10. The method of claim 1, wherein the dictionary learning solves $\tilde{D} = \mathrm{argmin}_D \|Y - D\alpha\|_F^2 \, s.t. \, \forall l, \|\alpha_l\|_0 \leq T_0,$ where Y is a matrix of L training data vectors, D is the dictionary $\alpha = [\alpha_1, \alpha_2, \ldots, \alpha_L]$ is a set of sparse coefficient vectors corresponding to L training data vectors, $T_0$ is a desired sparsity, and $\|\cdot\|_F$ denotes a Frobenius norm.

11. The method of claims 1 or 10, wherein the training data vectors couple the feature vectors of the Pan image with the feature vectors of the interpolated MS image.

12. The method of claim 10, wherein the learning uses a K-singular value decomposition (SVD).

13. The method of claim 1, wherein the missing values are uniformly distributed in the Pan image and the interpolated MS image.

14. The method of claim 2, wherein the patches of the Pan image overlap.

* * * * *